United States Patent [19]

Robinson

[11] 4,396,130

[45] Aug. 2, 1983

[54] PRESSURE COOKER HAVING SAFETY OPENING MEANS

[75] Inventor: Geoffrey Robinson, Brunley, England

[73] Assignee: Prestige Group Ltd., London, England

[21] Appl. No.: 365,436

[22] Filed: Apr. 5, 1982

[30] Foreign Application Priority Data

Apr. 10, 1981 [GB] United Kingdom ............... 8111370

[51] Int. Cl.$^3$ ............................................. B65D 45/00
[52] U.S. Cl. ................................................... 220/316
[58] Field of Search ............... 220/203, 298, 316, 303, 220/295; 126/374, 388

[56] References Cited

U.S. PATENT DOCUMENTS

| | | | |
|---|---|---|---|
| 2,627,997 | 2/1953 | Wittenberg | 220/216 |
| 4,162,741 | 7/1979 | Walker et al. | 220/203 |
| 4,251,007 | 2/1981 | Behnisch | 220/216 |

FOREIGN PATENT DOCUMENTS

| | | |
|---|---|---|
| 460587 | 2/1937 | United Kingdom . |
| 588021 | 5/1947 | United Kingdom . |
| 641540 | 8/1950 | United Kingdom . |
| 2056312 | 3/1981 | United Kingdom . |

Primary Examiner—George T. Hall
Attorney, Agent, or Firm—Joseph M. Weigman

[57] ABSTRACT

The body member and cover member of a pressure cooker are adapted to be held together by means of inter-engageable pairs of lugs arranged on each member. One or more selected pairs of lugs are constructed so that a shoulder on a first lug or lugs can interact with either of two linearly arranged projections carried by a second lug or lugs. The interaction of the selected pair of lugs produces two locking positions of the body and cover. The pressure cooker preferably incorporates a further safety mechanism, such as a gasket off-set device which prevents pressurization of the vessel if there is only partial overlap of the body and cover lugs.

8 Claims, 13 Drawing Figures

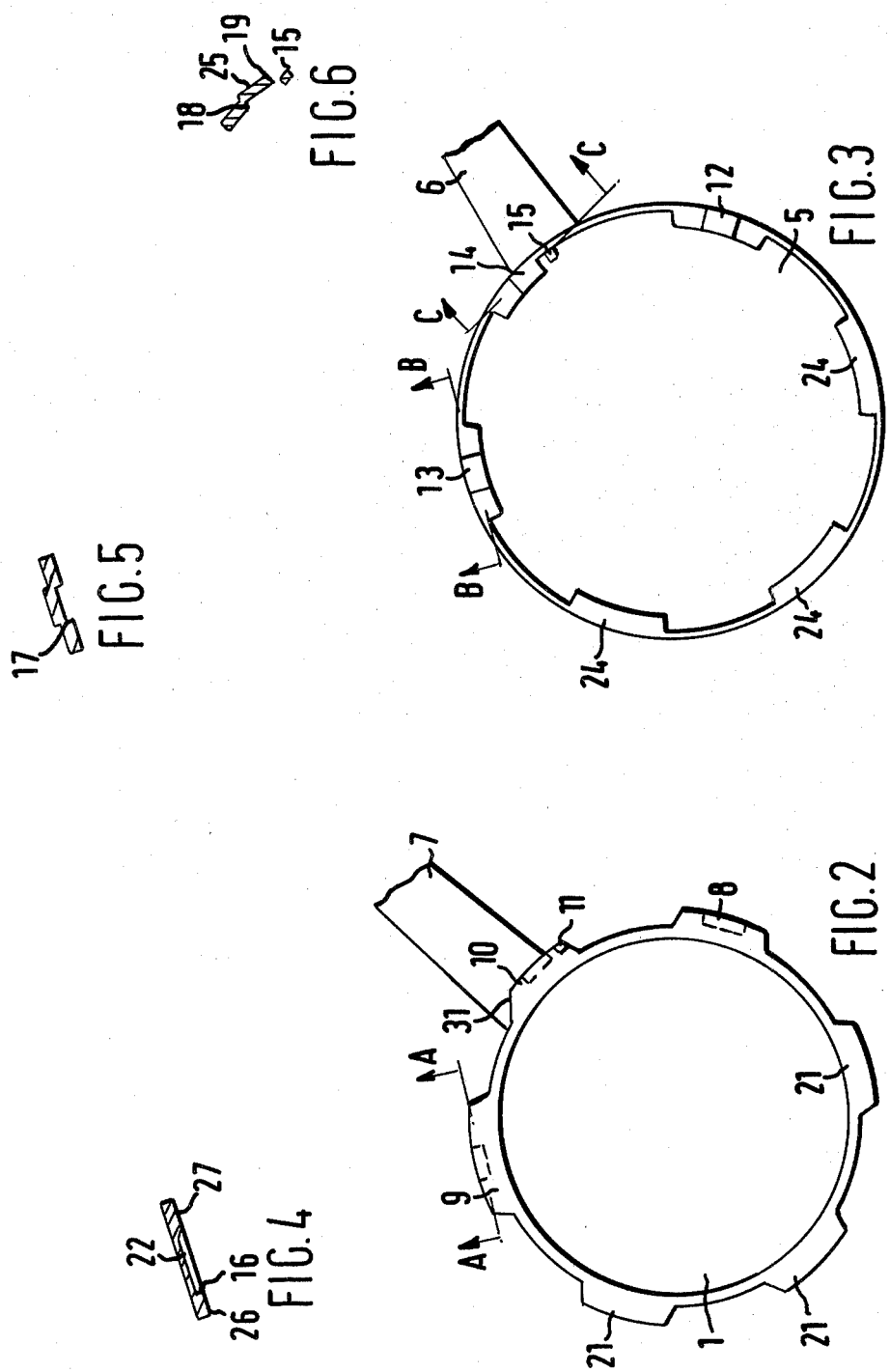

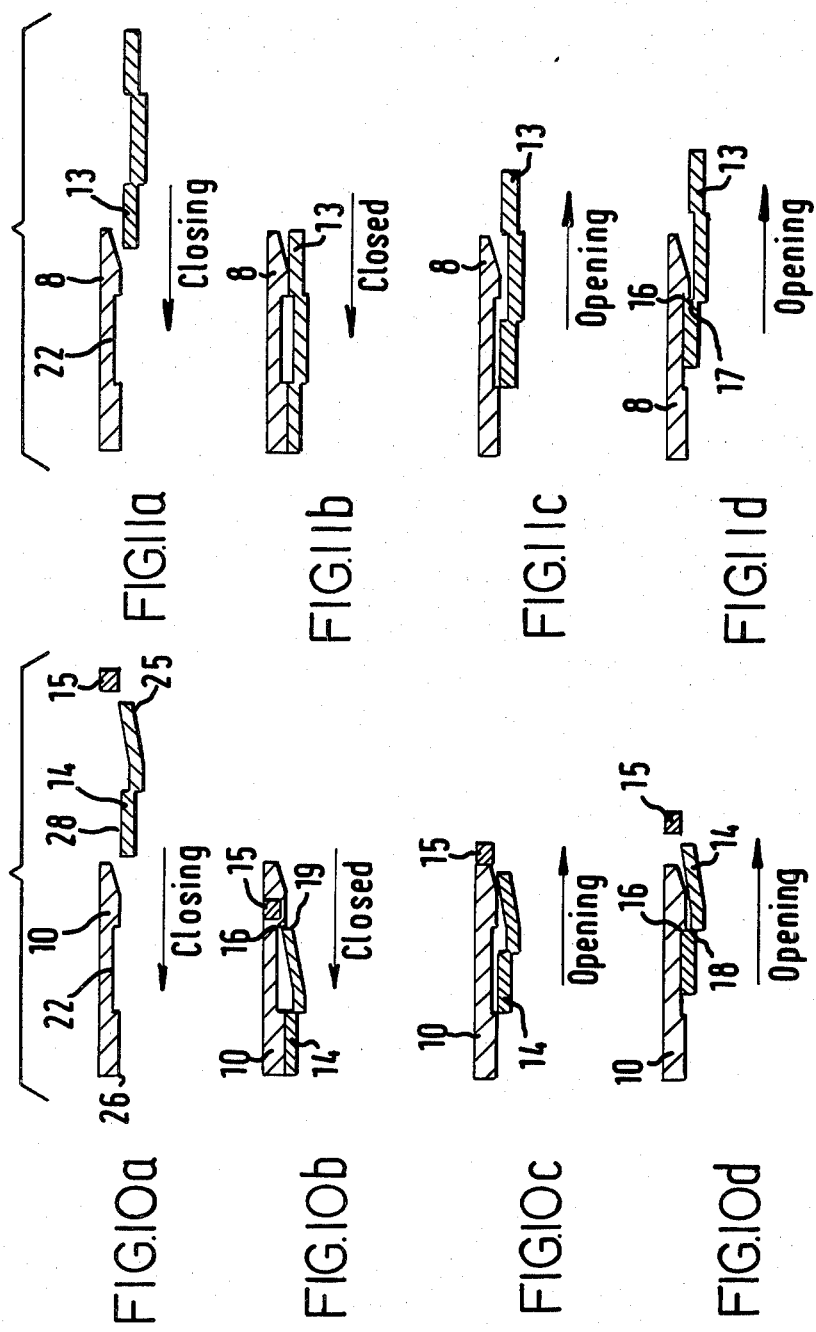

PRESSURE COOKER HAVING SAFETY OPENING MEANS

This invention relates to pressure cookers. More particularly it relates to pressure cookers of the type in which the body and the cover or lid are adapted to be held together by means of inter-engageable pairs of lugs. The lugs on the body are arranged around the outer periphery near the mouth and the lugs on the cover are arranged on the inner periphery of a downwardly depending flange. Rotation of the cover with respect to the body in one direction results in engagement of the pairs of lugs so that the contents of the cooker can be pressurised. A seal between the cover and body is ensured by means of a fitted gasket. Rotation of the cover in the opposite direction results in disengagement of the lugs allowing the cover to be removed.

It is desirable to incorporate a safety locking mechanism to prevent the cover being removed when the pressure within the cooker exceeds a predetermined safe pressure. A simple mechanism involves the use of modified body and cover lugs and an example of this is exemplified in U.S. Pat. No. 2,627,997 (E. H. Wittenberg). One disadvantage of such a mechanism is that the cover is not completely locked to the body when the lugs are in the fully engaged position and the vessel is pressurised; in this situation the cover can be rotated to an intermediate position where the lugs are only partially engaged and where the pressure within the cooker is allowed to escape. From the user's point of view it would be desirable to allow substantially no relative movement of the cover and body when the cooker is under operating pressure. Another disadvantage of the previous mechanism is that the dimensions of the lugs have to be accurately controlled, especially if it is required that the cooker cannot be opened when pressure within the cooker exceeds low values such as 0.04 bar (which are the standards set by some Authorities), and there is little margin for acceptable variations. This presents manufacturing problems.

Accordingly the present invention provides a pressure cooker comprising a body member and a cover member, a gasket positioned between the body member and the cover member, the cover member being adapted to be held on the body member by inter-engageable pairs of lugs, each pair of lugs comprising an outwardly directed lug on the body member and an inwardly directed lug on the cover member, the pairs of lugs being adapted to be brought into and out of engagement upon relative rotation of the cover member and body member, one or more selected pairs of lugs comprising a first lug or lugs carried by one member and a corresponding second lug or lugs carried by the other member, the first lug or lugs having a stepped portion forming a shoulder with the surface of the lug, and at least two linearly arranged projections carried by the second lug or lugs, the projections extending towards the surface of the first lug or lugs such that *when* the inter-engageable lugs are in the fully engaged position and the pressure within the pressure cookers exceeds a predetermined first value, a first projection of the second lug or lugs abuts a shoulder of a first lug preventing relative rotation of the cover and body members and furthermore *when* the inter-engageable lugs are in a selected partially engaged position with the first projection of the second lug or lugs clear of the shoulder of a first lug, disengagement of the lugs by relative rotation of the cover and body is prevented if the pressure within the cooker exceeds a second predetermined pressure, by abutment of a second projection on the second lug or lugs with a shoulder of the first lug or lugs.

The interaction of the selected pair of lugs produces two locking positions. In the first locking position, when the inter-engageable lugs are fully engaged, relative movement of the cover and body is prevented if the pressure within the vessel exceeds a first predetermined pressure. The first predetermined pressure may be, for example, 0.04 bar although it may be higher, e.g. 0.15 bar, if the pressure cooker incorporates an additional safety mechanism such as a gasket off-set member mentioned hereinbelow. Advantageously in the first locking position there is a visual indication that the cover is fully engaged. For example, in this position a handle on the cover member may be in alignment with a handle on the body member. The second locking position, where the inter-engageable lugs are in a partially engaged position, provides an additional safety feature which prevents complete opening of the cooker if the pressure within the cooker exceeds the second predetermined pressure. This feature is useful if the user inadvertently pressurises the cooker when the interengageable lugs are not quite fully engaged. Even after such mis-use, opening of the cover past the second locking position is prevented if the pressure exceeds the second predetermined pressure. This second predetermined pressure may be higher than the first predetermined pressure.

The two projections carried by the second lug or lugs may both be carried on one lug or they may be carried by separate lugs. If the projections are on, for example, two separate lugs then in the first locking position a projection on one second lug abuts the shoulder on one first lug. In the second locking position this projection is clear of the above-mentioned shoulder while a projection on another second lug abuts the shoulder of another first lug.

Preferably a second lug of the selected pair carries two projections, the projection comprising a bearing surface, and the first lug comprises two lands separated by a recess, the first land comprising the stepped portion, such that when the inter-engageable lugs are in fully engaged position and the pressure within the cooker exceeds the first predetermined pressure the first projection of the second lug lies within the recess of the first lug and the bearing surface of the second lug contacts the second land of the first lug and when the inter-engageable lugs are in the selected partially engaged position and the pressure within the vessel exceeds the second predetermined pressure, relative rotation of the cover and body members is prevented by abutment of the bearing surface of the second lug with a side of the recess of the first lug.

It is preferred that the second lug is carried by the cover and the first lug is carried by the body although the reverse arrangement is also possible.

Either the cover or the body preferably carries a stop member to prevent relative rotation of the body and cover past the fully engaged position during the closing procedure.

If not all the lugs possess the features of the selected pair or pairs it is preferable that one or more of the remaining lugs or the gap between them is so constructed that the cover can only be placed upon the body in a position where the selected pair or pairs of lugs can co-operate upon relative rotation of the cover and body. For example one of the lugs on the body may be larger than the other body lugs and there may be corresponding larger gap between a pair of cover lugs.

It is preferable to incorporate in the pressure cooker a further safety mechanism which prevents pressurisation of the vessel if there is only partial overlap of the body and cover lugs. In one such mechanism part of the gasket is pushed towards the interior of the vessel by a resilient actuated mechanism (e.g. spring actuated) in positions where partial overlap exists. The movement of part of the gasket ensures that the pressure cooker is not sealed and that there is communication between the interior of the vessel and the atmosphere. When there is sufficient overlap of the body and cover lugs the mechanism is retracted so allowing the gasket to seal the vessel enabling it to be pressurised. This mechanism is termed a gasket off-set member and an example is shown in U.S. Pat. No. 2,948,431 (Kuhn). Accordingly a preferred pressure cooker of the present invention includes a gasket off-set member for operating on the gasket, the gasket off-set member being controlled by resilient means such that when the cover and the body are relatively rotated to bring the lugs from the completely disengaged position into the fully engaged position the gasket off-set member under the action of the resilient means holds a portion of the gasket away from the internal surface of the cooker to prevent sealing of the pressure cooker by the gasket until the lugs have passed through the selected partially engaged position and when in the fully engaged position the gasket off-set member is adapted to be held, against the action of the resilient means, clear of the gasket such that the pressure cooker is sealed by the gasket enabling the cooker to be pressurised.

When it is desired to close the pressure cooker of the present invention incorporating the gasket off-set member the cover is first placed on the body. In this initial position the gasket off-set member operates to prevent pressure to be built up within the cooker. On relative rotation of the cover and body the lugs pass through the selected partially engaged position and it is not until this position is passed (and hence the lugs are almost in the fully engaged position) that the gasket is allowed to seal to allow pressure to be built up. When the lugs are in the fully engaged position and the pressure in the cooker is above a predetermined low level, the cooker cannot be opened because of the above mentioned abutment between the first and second lugs. If, for any reason this abutment fails or the cover is forcibly rotated the gasket off-set member will operate on the gasket to break the seal and reduce the pressure in the cooker. Opening of the cover past the second locking position will not be possible until the pressure falls below the second predetermined pressure even if there is any failure in the operation of the gasket off-set member. Thus the preferred pressure cooker incorporating the gasket off-set mechanism has a combination of safety features which are simple in construction and which are effective in both the closing and opening operations. The cooker of the present invention has advantages over other prior pressure cookers incorporating a gasket off-set mechanism in which it was necessary to position the mechanism, relative to the lugs, so that when opening the cooker the member operated on the gasket relatively late in the opening rotation procedure to prevent an objectionable discharge of steam at high pressure. As a corollary this meant that in the closing sequence the gasket off-set member had to seal the vessel relatively early in the closing procedure. This is a disadvantage since the vessel could be pressurised despite the fact that there was only partial overlapping of the lugs. This disadvantage is overcome with the present invention where the gasket-off mechanism allows the vessel to be sealed only towards the end of the closing cycle.

A pressure cooker in accordance with the invention will now be described with reference to the accompanying drawings in which:

FIG. 2 is a plan view of the body of the pressure cooker with the cover removed.

FIG. 3 is a plan view of the inverted cover.

FIG. 4 is a cross sectional view of one of the body lugs as viewed in direction AA of FIG. 2.

FIG. 5 is a cross sectional view of one of the cover lugs as viewed in direction BB of FIG. 3.

FIG. 6 is a cross sectional view of another cover lug and gasket off-set device as viewed in direction CC of FIG. 3.

FIG. 10 is a diagrammatic representation showing the relative position of a body lug and the cover lug of FIG. 6 during the opening and closing sequence.

FIG. 11 is a diagrammatic representation showing the relative position of a body lug and the cover lug of FIG. 5 during the opening and closing sequence.

Figure 1:
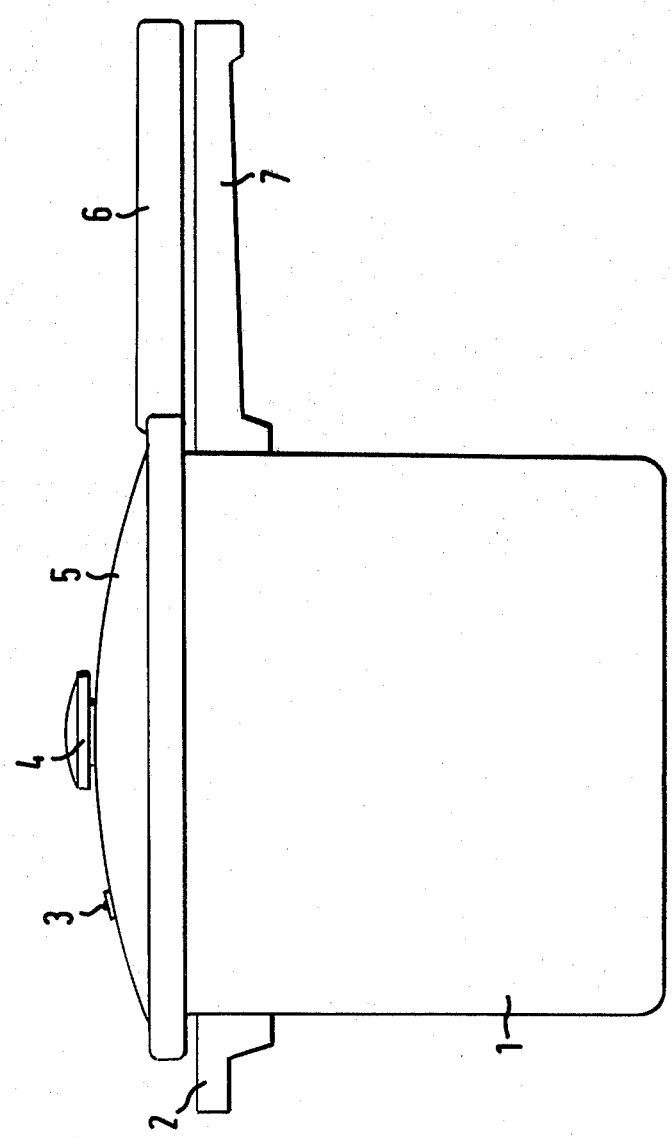
FIG. 1 is a side elevation of a pressure cooker incorporating the present invention.

As shown in FIGS. 1 to 11 a pressure cooker comprises a body 1 and a cover 5. The body carries an auxiliary handle 2 and a main handle 7. In the cover 5 there is a safety plug 3 and a valve controlled by a weight 4. The cover also carries a handle 6. The cover 5 may be rotated relative to the body 1 from the initial loading position, illustrated in FIG. 8 to the fully closed position illustrated in FIG. 9. In the latter position the cover handle 6 is vertically above the main body handle 7.

The body 1 has a series of six outwardly directed lugs 8,9,10,21,21,21 arranged around its mouth for engagement with corresponding lugs on the cover. Lugs 8, 9 and 10 have recesses 22 formed on their underside between two bearing surfaces 26,27. The recess has a sharp edge 16 at one end, the other end being chamfered. The lug 9 is wider than the remaining lugs while the lug 10, which is positioned above the handle 7, has a downwardly directed portion at one end to form a stop 11.

The cover has a downwardly directed flange 23 carrying six inwardly facing lugs 13,12,14,24,24,24 for engagement with corresponding lugs 8,9,10,21,21,21 on the body. Lugs 12 and 13 have recesses formed in their surfaces as shown in FIG. 5. The recess has a sharp edge 17. Lug 14, which is positioned close to the cover handle 6, has a portion 25 having a sharp edge 19 raised above the bearing surface 28.

The distance between cover lugs 14 and 12 is greater than the distance between the other cover lugs so that the larger body lug 9 can only be located between cover lugs 14 and 12 when the cover is first placed on the body. Rotation of the cover brings the cover lugs under the body lugs so closing the vessel.

Situated between the cover 5 and the top of the body 1 is a V-shaped gasket 20 which seals the cover and body when the cover is in the fully closed position.

Figure 8:
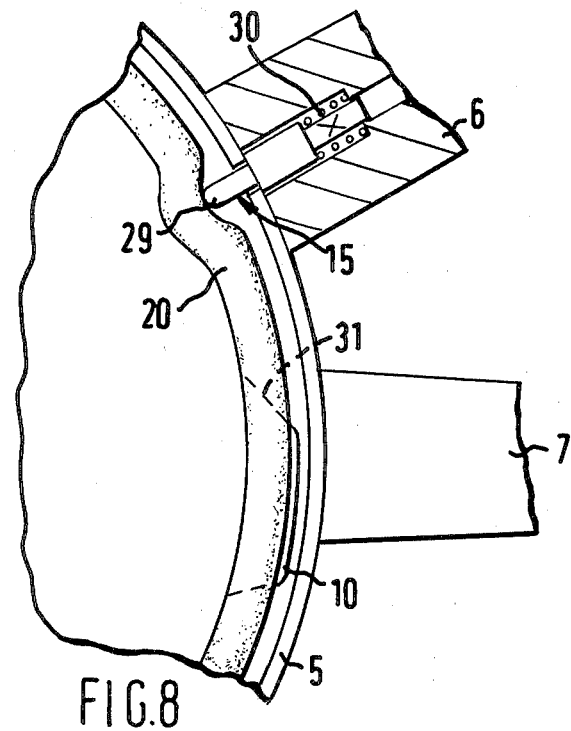
FIG. 8 is a partial sectional view of the body and cover assembly in the initial loading position of the cover on to the body.
Figure 7:
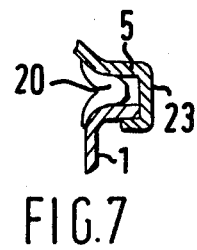
FIG. 7 is a partial sectional side view of part of the body, cover and gasket.
Figure 9:
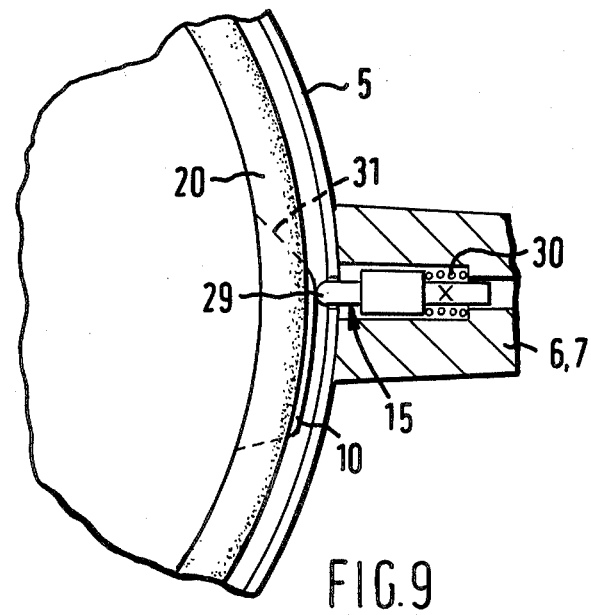
FIG. 9 is a partial sectional view of the body and cover assembly in the fully closed position.

As shown particularly in FIGS. 8 and 9, a gasket offset device 15 is mounted within a blind hole in the cover handle 6. The gasket off-set device comprises a reciprocably mounted plunger 29 which projects inwardly through a hole in the cover. The plunger 29 is urged inwardly, i.e. towards the axis of the lid, by a compression spring 30. When the cover is in the position shown in FIG. 8 the plunger contacts the gasket 20 displacing a portion thereof so that there is communication between the interior of the pressure cooker and the atmosphere. As the cover is gradually rotated to the fully closed position the plunger 29 rides up a camming edge 31 of the body lug 10 until the plunger is clear of the gasket (as shown in FIG. 9). In this position the gasket is in sealing engagement between the body 1 and the cover 5 and the vessel may be pressurised.

The interaction of the body and cover lugs during the closing and opening procedure will now be described with particular reference to FIGS. 10 and 11. FIG. 10a shows the relative positions of the body lug 10, the cover lug 14 and the gasket off-set device 15 when the cover is placed on the body in the initial loading positions. In this position the plunger of the gasket off-set device will contact the gasket so preventing any build up of pressure within the vessel. FIG. 11a shows the corresponding relative positions of body lug 8 and cover lug 13. As the cover is rotated to close the vessel the cover lugs come to lie under the body lugs until the position indicated in FIGS. 10b and 11b is reached where the lugs are in the fully engaged position. As shown in FIG. 10b the gasket off-set device has cammed up the body lug so enabling pressure to be built up within the pressure cooker. When the cooker is pressurised the bearing surface 28 of the lug 14 co-operates with the bearing surface 26 of the lug 10 and the raised portion 25 of the lug 14 lies within the recess 22 of the lug 10. The engaging of the sharp edges 16 and 19 of the two lugs prevent the cooker from being opened if the pressure within the vessel is above a predetermined value. This is a first locking position. When the cooker is opened by rotation of the cover in the direction opposite to that employed for closing, the lugs pass through an intermediate position indicated in FIGS. 10c and 11c. As shown in FIG. 10c the plunger of the gasket off-set device 15 is no longer cammed up the body lug and hence the plunger breaks the seal formed by the gasket so releasing pressure within the cooker. Once the pressure is released the cover may be opened completely.

The position illustrated in FIG. 10d is a second locking position in which the bearing surface 28 of the lug 14 is within the recess 22 of the lug 10. The sharp edges 16 of the body lug and the sharp edge 18 of the cover lug are in line preventing further opening if pressure above a second predetermined level is present in the cooker for any reason, e.g. through failure of the gasket off-set mechanism. The operation of the lugs in FIG. 11d is similar with the sharp edge 16 of the body lug 8 in line with the sharp edge 17 of the cover lug 13. Operation of body lug 9 and cover lug 12 is identical so that the second locking position is a three point safety position. Provided that the pressure within the cooker is below the second predetermined level the cover may be further rotated in the opening direction until the lugs are disengaged as shown in FIGS. 10a and 11a. The cover may then be removed from the body.

Figure 12A:
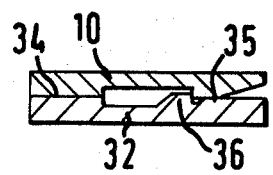
FIG. 12 is a diagrammatic representation of a body lug and a modification of the cover lug of FIG. 6.
Figure 12B:
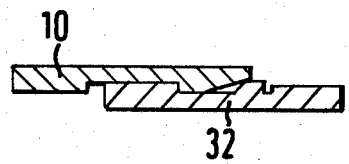
Figure 13A:
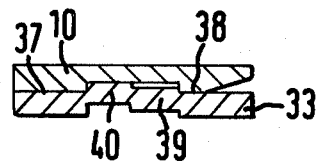
FIG. 13 is a diagrammatic representation of a body lug and a further modification of the cover lug of FIG. 6.
Figure 13B:
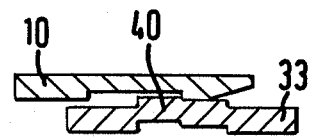

Alternative form of cover lugs are illustrated in FIGS. 12 and 13. In these figures the cover lug 32 and 33 are modified forms of the cover lug 14 and are shown in relationship to the body lug 10. FIGS. 12a and 13a shows the lugs in the first locking position (corresponding to that shown in FIG. 10b) and FIGS. 12b and 13b show the lugs in the second locking position (corresponding to that shown in FIG. 10d).

The modified cover lug 32 shown in FIG. 12 has two bearing surfaces 34 and 35 which engage with corresponding bearing surfaces on the body lug 10 when the lugs are in the first locking position shown in FIG. 12(a). Intermediate these bearing surfaces is raised portion 36 which acts as the raised portion 25 in the cover lug 14.

The modified cover lug 33 shown in FIG. 13 also has two bearing surfaces 37 38 which engage with the corresponding bearing surfaces on the body lug 10 when the lugs are in the first locking position shown in FIG. 13a. The modified lug 33 has two raised portions 39, 40 intermediate the bearing surfaces 37,38, the raised portion 40 being slightly higher than the raised portion 39. The raised portion 39 acts as the raised portion 25 in the cover lug 14, i.e. in the first locking position it lies within the recess of the body lug thus preventing opening of the cover when the vessel is pressurised above the first predetermined pressure. When in the second locking position (FIG. 13b) the second raised portion 40 of the cover lug 33 lies within the recess of the body lug thus preventing further opening of the cover if the pressure within the vessel exceeds the second predetermined pressure.

I claim:

1. A pressure cooker comprising a body member and a cover member, a gasket positioned between the body member and the cover member, the cover member being adapted to be held on the body member by inter-engageable pairs of lugs, each pair of lugs comprising an outwardly directed lug on the body member and an inwardly directed lug on the cover member, the pairs of lugs being adapted to be brought into and out of engagement upon relative rotation of the cover member and body member, one or more selected pairs of lugs comprising a first lug or lugs carried by one member and a corresponding second lug or lugs carried by the other member, the first lug or lugs having a stepped portion forming a shoulder with the surface of the lug, and at least two linearly arranged projections carried by the second lug or lugs, the projections extending towards the surface of the first lug or lugs such that when the inter-engageable lugs are in the fully engaged position and the pressure within the pressure cooker exceeds a predetermined first value, a first projection of the second lug or lugs abuts a shoulder of a first lug preventing relative rotation of the cover and body members and furthermore when the inter-engageable lugs are in a selected partially engaged position with the first projection of the second lug or lugs clear of the shoulder of a first lug, disengagement of the lugs by relative rotation of the cover and body is prevented if the pressure within the cooker exceeds a second predetermined pressure, by abutment of a second projection on the second lug or lugs with a shoulder of the first lug or lugs.

2. A pressure cooker as claimed in claim 1 wherein a second lug of the selected pair carries the two projections, the second projection comprising a bearing surface, and the first lug comprises two lands separated by a recess, the first land comprising the stepped portion, such that when the inter-engageable lugs are in fully engaged position and the pressure within the cooker exceeds the first predetermined pressure the first projection of the second lug lies within the recess of the first lug and the bearing surface of the second lug contacts the second land of the first lug and when the inter-engageable lugs are in the selected partially engaged position and the pressure within the vessel exceeds the second predetermined pressure, relative rotation of the cover and body members is prevented by abutment of the bearing surface of the second lug with a side of the recess of the first lug.

3. A pressure cooker as claimed in claim 2 wherein the second lug is carried by the cover member and the first lug is carried by the body member.

4. A pressure cooker as claimed in any one of claims 1 to 3 wherein either the cover member or the body member carries a stop member so as to prevent relative rotation of the body member and the cover member past the fully engaged position during the closing procedure.

5. A pressure cooker as claimed in any one of claims 1 to 3 wherein not all the lugs possess the features of the selected pair or pairs and one or more of the non-selected lugs are so dimensioned that the cover member can only be placed upon the body member in a position where the selected pair or pairs of lugs can co-operate upon relative rotation of the body and cover members.

6. A pressure cooker as claimed in any one of claims 1 to 3 which includes a gasket off-set member for operating on the gasket, the gasket off-set member being controlled by resilient means such that when the cover and the body are relatively rotated to bring the lugs from the completely disengaged position into the fully engaged position the gasket off-set member under the action of the resilient means holds a portion of the gasket away from the internal surface of the cooker to prevent sealing of the pressure cooker by te gasket until the lugs have passed through the selected partially engaged position and when in the fully engaged position the gasket off-set member is adapted to be held, against the action of the resilient means, clear of the gasket such that the pressure cooker is sealed by the gasket enabling the cooker to be pressurised.

7. In a pressure cooker made up of a cover member and a body member removably connected by a plurality of inter-engageable pairs of lugs, one lug of each pair being formed on the cover member and the other being formed on the body member, and being brought into and out of engagement upon relative rotation of the cover member and body member, the improvement comprising:
  a. at least one first lug having a stepped portion forming a shoulder with one surface thereof; and
  b. at least one second lug inter-engageable with said first lug having first and second projections linearly arranged thereon extending toward said first lug, whereby when said first and second lugs are fully engaged and the pressure within the cooker exceeds a predetermined first value, said first projection of said second lug is in a first position which engages said shoulder of said first lug preventing relative rotation of said cover member and said body member, and furthermore whereby when the internal pressure exceeds a second predetermined pressure, said second projection on said second lug is in a second position which engages said shoulder of said first lug preventing relative rotation of said cover member and said body member.

8. A pressure cooker improvement as defined in claim 7 wherein said second projection of said second lug is a bearing surface and said first lug further comprises first and second lands separated by a recess, whereby relative rotation of said cover member and said body member is prevented by engagement of the bearing surface with a side of said recess of said first lug.

* * * * *